Jan. 15, 1952  N. C. WILLIAMS  2,582,612
TRAILER RELAY VALVE FOR VACUUM BRAKES
Filed March 15, 1948  3 Sheets-Sheet 1
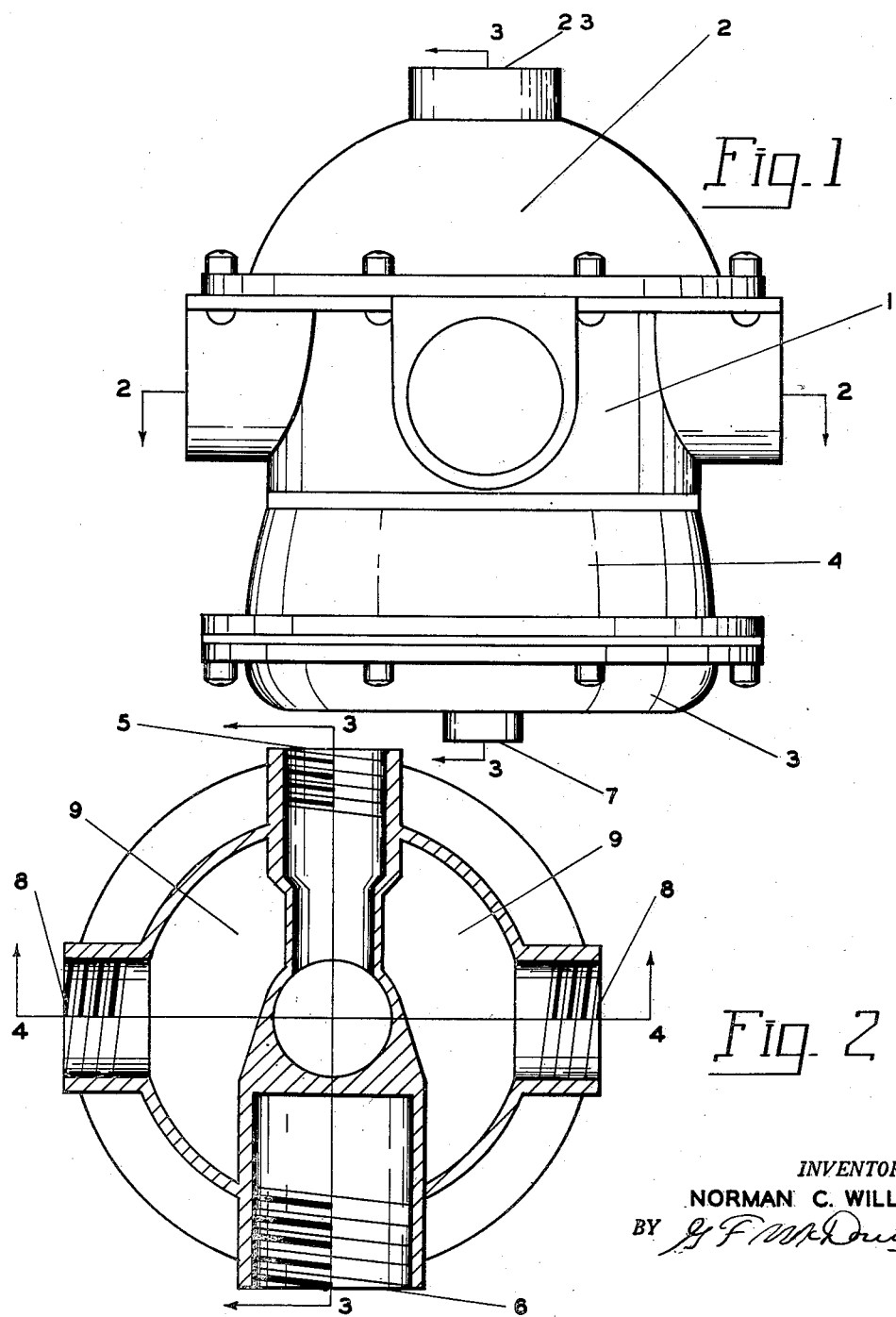
INVENTOR.
NORMAN C. WILLIAMS
BY

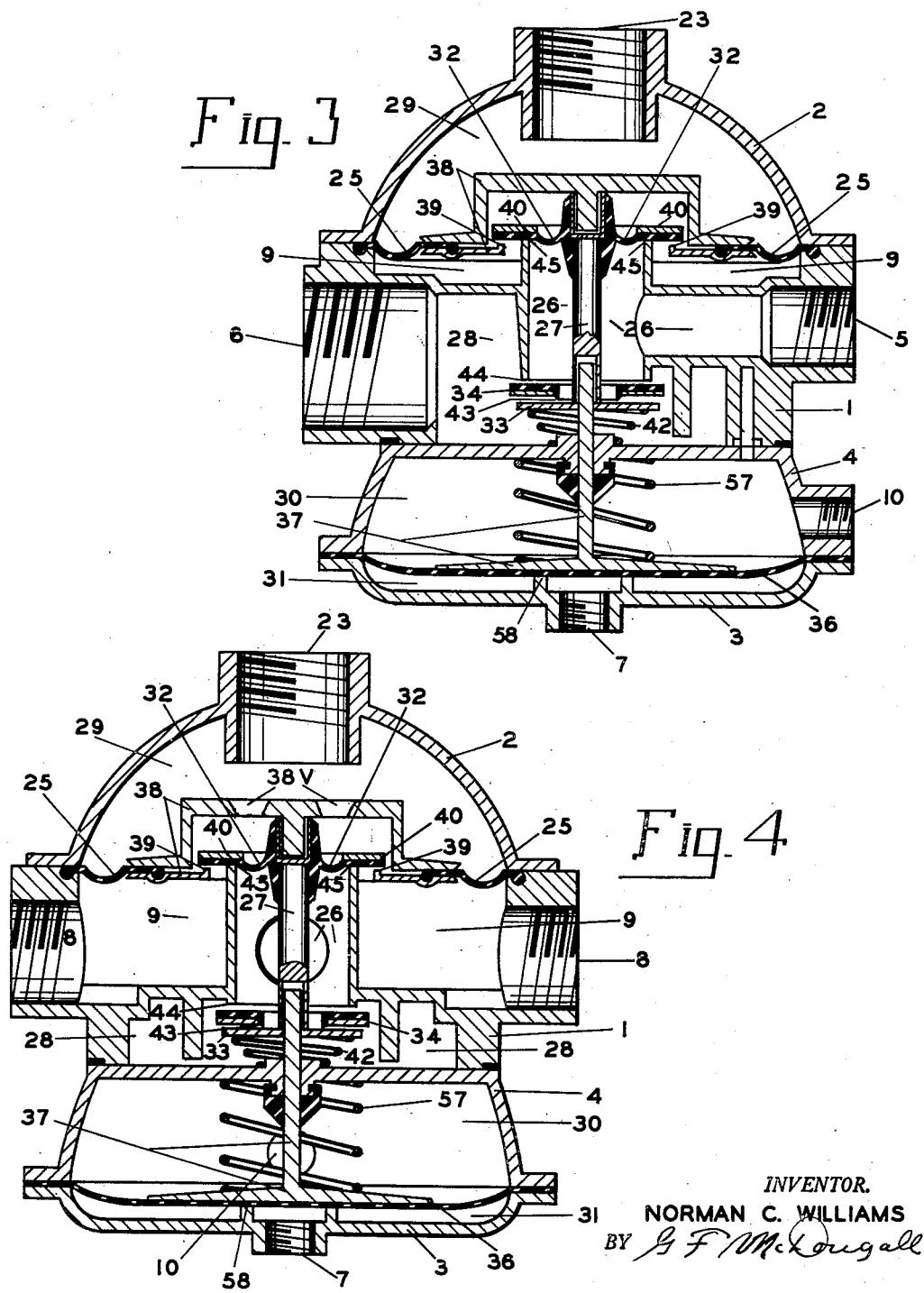

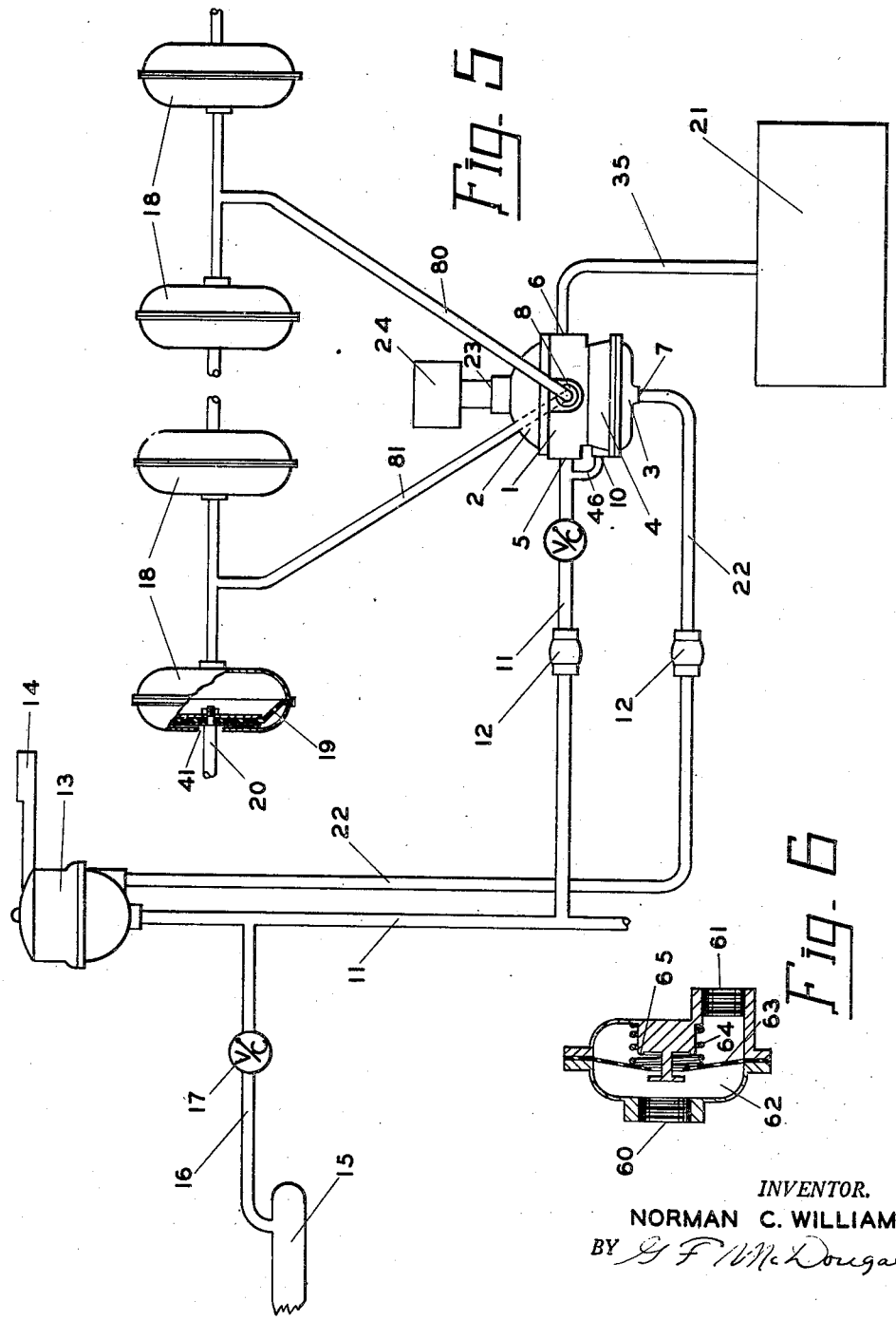

Patented Jan. 15, 1952

2,582,612

UNITED STATES PATENT OFFICE 2,582,612

TRAILER RELAY VALVE FOR VACUUM BRAKES

Norman C. Williams, Portland, Oreg., assignor to Power Brake Equipment Co., Portland, Oreg., a company Application March 15, 1948, Serial No. 14,983

5 Claims. (Cl. 303—31)

This invention relates to a trailer relay valve for vacuum brakes, especially as used on haulage vehicles that include a tractor and separable trailer, though it is useful for unitary trucks and other vehicles of the heavy type that require brakes.

Speaking from a strictly technical viewpoint, "vacuum brakes" are operated by air at atmosphere pressure, the available force being the difference between atmosphere and the lower pressure, which is always something above a complete vacuum. Since the trucking art regards the source of vacuum as the source of braking power, which is indirectly correct, it is thought that the following explanation will be far clearer to those concerned with this invention to treat the vacuum as a positive instead of a negative force.

The over-all object of the present invention is to speed up the application of vacuum brakes on a trailer vehicle and to make it possible to realize the maximum braking effect in a much shorter time than can be otherwise expected.

It has long been the practice with air brakes and vacuum brakes alike, to place an auxiliary reservoir on a trailer vehicle within which brake-setting energy can be stored and to make the energy in such reservoir automatically available, either by control valve operable by the driver or by a break-away that admits atmosphere pressure to the conduit through which the vacuum energy for the trailer was originally supplied. This mode of operation is still included with my new relay valve, but the relay valve superposes an additional function that is believed to be entirely novel and greatly speeds up the application of vacuum brakes in the orderly manner of their application by the manual valve control referred to, in this way.

In applying trailer brakes, the mode referred to, of utilizing the vacuum energy stored in the reservoir for initial movement of the brake applicators, is adhered to. The source of energy is usually the engine manifold. When braking is required, the engine, driven by the load, is a highly effective vacuum machine.

The reservoir will be available for brake application. The first energy impulse comes from the reservoir when the brake applicators will move the brakes into braking contact with their respective brake drums under influence, mainly, of energy from the reservoir, thus depleting the store of energy in the reservoir materially.

It is the object of the relay valve of the invention to close off the reservoir with its partially depleted store of energy at the very instant that the degree of vacuum in the conduit supplying vacuum energy from the engine exceeds the impaired degree of vacuum in the reservoir, thus making the high vacuum resulting from a large engine being driven by a heavy load at considerable speed, available to the brake applicators without waiting for this engine source of energy to restore the reservoir and with it the actuated brakes to the maximum energy within the capacity of the engine, as desired by the operator.

The function is then that when the desired amount of brake power has been reached, the port leading to the reservoir is automatically re-opened to permit the engine source to restore the energy of the reservoir at what we call its leisure.

Drawings accompany and form a part of this specification, in which—

Fig. 1 is a side view in elevation of a preferred form of the invention;

Fig. 2 is a transverse section of the structure of Fig. 1, taken on the plane 2—2 of Fig. 1;

Fig. 3 is a section of Fig. 2, taken on the plane 3—3, Fig. 2;

Fig. 4 is a section taken on the plane 4—4, Fig. 2;

Fig. 5 is a diagram, showing the structure of the invention in the median area with pipes, auxiliary controls and other known structures used to form one operative vacuum brake trailer equipment, as will be explained. There are several different types of brake systems, with which the identical form of the invention is useful; and Fig. 6 is a view of the special check valve that will be explained hereinafter.

Explaining the figures in greater detail, not as limiting the invention but to clarify the structure here employed, to illustrate the principles and the best structure of the invention itself yet developed.

Beginning with Figs. 1 and 2, numeral 1 represents a body with a cap 2, a base cap 3, and a tubular extension 4, for the body 1, all of which, when secured together in the relationship shown, make a hermetically tight container for valve apparatus hereinafter described. There are several pipe connections, namely a main energy connection 5, an auxiliary reservoir connection 6, a control connection 7, brake applicator ports 8, there being two, at opposite ends of the common inner chamber 9, an atmosphere interconnection 23 and a second vacuum energy connection 10.

I will now describe the conduits that are connected to the various ports. Conduit 11, for example, is connected to port 5, and close to the body 1, of the invention contains a normally "open" check valve VC, the purpose of which is to close in case of an accidental breakaway.

The normally open check valve is so constructed that it will remain open to a relatively small volume of air by reason of a light spring bias, but when a large volume of air surges against it, it closes like an ordinary check valve.

Conduit 11 also contains one of the two hose couplings 12, employed in connecting and disconnecting a trailer from the tractor, and conduit 46 serves to connect conduit 11 to port 10.

Vacuum energy in this illustration is shown as derived from the manifold 15, which is connected by the conduit 16 to the conduit 11, and of necessity contains a closed type check valve 17, another well known instrument to the brake art.

The conduits 80 and 81 are connected to the ports 8 on the relay valve of the invention and serve the purpose of controlling the brake applicators, all numbered 18 since they are identical and well known. One of the applicators has been broken away in part to show the diaphragm 19, which, with the pull-rod 20, works concurrently to set brakes on a brake drum. Both instruments are shown in full release position.

Numeral 21 represents the well known auxiliary reservoir connected by conduit 35 to the relay valve of the invention at the port 6. Conduit 22 is an air inlet pipe connected to port 7 of the relay valve and serves to admit atmosphere pressure, to apply brakes, or vacuum to release the brakes, when the lever 14 is properly moved, and contains the other hose coupling 12, previously mentioned.

The relay valve itself and how it operates under different conditions will now be explained.

On top of the cap 2, is a port 23, to which is applied an air cleaner 24, through which atmosphere can enter to release the brakes when such action is required. When atmosphere pressure exists on both sides of the diaphragm 25, the natural springiness of the diaphragm is biased to release position as shown in Figs. 3 and 4.

When equal atmosphere pressure exists in the chambers 26, 28, 29, 30, 9 and 31, the brakes are in full release position and the valve parts are as shown in Figs. 3 and 4, no vacuum energy present in any part of the brake system. When vacuum is established in chamber 26 and concurrently in chambers 30 and 31, with atmosphere pressure in chambers 9 and 29, the brakes are likewise in full release. The diaphragm 25 is annular, with the center spanned by a bridge 38.

Chamber 26 is a main suction energy chamber, deriving the energy from the engine manifold 15; 28 is the auxiliary reservoir chamber; 29 is the atmosphere chamber, always connected to atmosphere; 30 is a vacuum chamber, employed to displace atmosphere from the upper side of diaphragm 36 so that brake operating chamber 31, by the admission of atmosphere through conduit 22, will, through the agency of the valve stem 27, overcome the smaller diaphragm 25, and by overcoming it, close the valve 39 and open valve 40; thus chamber 9 is the common terminus of conduits 80 and 81 to place all of the brake operators 18 in communication with suction means, the main energy chamber 28 and the auxiliary reservoir 21 to set the brakes. It is thus seen that chamber 30 is properly named the brake setting chamber.

A diaphragm 32, is responsive to atmosphere pressure in chamber 29 to push the valve stem 27 downward to open the pilot valve 33 when vacuum is admitted to chamber 26. Diaphragm 32, having greater effective area than that of the pilot valve 33, causes 33 to leave its seat 43, thus relieving the heavy load on the main valve 34, which permits it to drop free of its seat 44, admitting full vacuum energy conditions into chamber 28, whereby vacuum is established in the conduit 35, and the auxiliary reservoir 21. This vacuum energy condition originates in the manifold 15 and is applied through conduit 16 to conduit 11 and to control valve 13, and, when lever 14 is in release position, to conduit 22, which represents normal driving condition.

To apply brakes, the degree of application being controlled by the lever 14, the amount of atmosphere needed is supplied through conduit 22 to the chamber 31. The diaphragm 36, operating under influence of admitted atmosphere, against the stem 37 and its plate-like head, causes stem 37 to rise against stem 27 with which it is telescoped, a form of lost motion device. As stem 27 is moved upward, valve 34 and pilot valve 33 are moved upward toward their seats 44 and 43 respectively by the influence of spring 42. As the stems 37 and 27 are moved upward, they lift the cage assembly 38, and close chamber 29 from chamber 9 by lifting the annular valve seat 39, a part of the cage assembly 38, against the poppet valve 40, made integral with diaphragm 32, thus lifting poppet valve 40 from seat 45, placing chamber 9 in direct communication with the vacuum energy sources through chamber 26. Stem 27 is of sufficient length that poppet valve 40 must leave seat 45 before valves 34 and 33 can completely close, however, as chamber 26 is opened to communication with chamber 9, conduits 80 and 81, and brake applicators 18, the atmosphere present in chamber 9, conduits 80 and 81 and chambers 18, moves rapidly into chamber 26.

As the weight of this mass of atmosphere strikes the large area of valves 33 and 34, spring 42 easily yields, permitting said atmosphere to enter chamber 28, conduit 35 and auxiliary reservoir 21, thus depleting the reserve of vacuum energy in the storage tank. Some of this atmosphere is also drawn from chamber 26 through conduit 11 and conduit 16 to the vacuum source, here indicated as the manifold 15. Since vacuum energy is effective in conduits 80 and 81, through ports 8, and thus within the brake applicators 18, their diaphragms such as 19 promptly move under influence of atmosphere entering through the annular enlarged openings 41, and the brakes are applied, thus the reservoir energy supply close at hand applies the brakes rapidly within its capacity if a full application is called for by the movement of lever 14, and deteriorates in proportion to the amount of air it absorbs from the brake applicators. At this point, and if a higher degree of vacuum energy is available from the manifold 15, which is usually the case, valves 33 and 34 close because of their unbalanced attitude, also by reason of the spring 42, which is much lighter than it was necessary to draw it.

This closure against the seats 43 and 44 seals the auxiliary reservoir with the air it has stored from brake applicators, permitting superior vacuum energy from the motor to set the brakes to the maximum amount called for by the movement of the handle 14. This is possible because of the power of diaphragm 36 being greater than the reacting power of atmosphere, present at all times in chamber 29, against diaphragm 25.

When the brake applicators and connected conduits and chambers reach the selected vacuum, what is called the balance point is reached. In other words, opposing forces acting against diaphragms 36 and 25 are balanced, valve 40 closes on seat 45, and stem 27 being of sufficient length, causes valve 33, to leave its seat 43, permitting the surplus energy from manifold 15, to withdraw the air from the reservoir 21 and build up its vacuum to full manifold vacuum; this without in any wise interfering with the set brake application.

When the operator desires to release the brake application, by manipulating the control valve handle 14 to release position, full vacuum is restored in the control line 22. This causes the vacuum to be equal in chambers 30 and 31, thus relieving the diaphragm 36. Spring 57 returns said diaphragm and also plate and stem 37 to rest on stop 58. At the same time atmosphere in chamber 29 drives relay control diaphragm assembly 38 down away from seat against the underside of relay poppet valve 40, permitting atmosphere from chamber 29 and air cleaner to pass into chamber 9 and on into the brake power chambers, thus releasing the brake application.

The special check valve "VC" known to the art as an "open type" check valve, is inserted in the conduit 11 by its inlet 60 and to the relay instrument of the invention by outlet 61. It embodies a chamber 62 and a diaphragm 63, supported by a light spring 64. The diaphragm is seatable against the annular valve seat 65, when a sharp inward rush of air, acting against the large area of the diaphragm 63, overcomes the spring 66, when, until conditions are changed, atmosphere is excluded from the relay through the conduit 11. Applying vacuum to conduit 11 will restore the valve to its normal state as it is shown in the figure.

When a breakaway occurs to a normally operative brake system, both conduits 22 and 11 are consequently severed, the action is as follows:

When conduit 11, being normally at high vacuum, is severed, atmospheric pressure attempts to seek the vacuum in the trailer storage system, causing check valve VC to close as has been previously described. At the moment that the conduit 22 is severed, full atmospheric pressure is admitted to chamber 31, thus causing a normal action of application to occur, except that the degree of application is limited to the capacity of reservoir to equalize the vacuum in the reservoir 21, and the applicators 19.

Thus it is seen that we first applied the brakes, instantaneously, with all of the power available in the storage tank; later, without having to await pumping a high vacuum in the storage tank, supplemented the brake application by direct energy from the manifold, and substantially increased the speed of arriving at the desired degree of brake application. Afterwards we were able to restore the storage tank, as it were at leisure, until its maximum energy was available, without in any way modifying the brake application. Should maximum brake application be desirable, later, an abundant supply of energy is available.

In vacuum brakes as practiced, the trailer reservoir furnishes an immediate available supply of energy, at the expense of its degree of stored energy, which in both reservoir and brake applicators will be substantially less than the original degree of vacuum, and to get a maximum brake application, which may be and often is needed in the shortest possible time, the engine must pump both the reservoir and the brake applicators up to maximum, which takes valuable time.

Now, by using the invention described, we can use the storage tank, as before, for instantaneous applications and then by-pass it at any time that a superior intensity of vacuum is available, go on from there to maximum braking as desired and restore the storage tank, as it were at leisure.

Having fully described my invention so that an engineer familiar with vacuum brakes can construct and use it, what I claim as new and desire to secure by Letters Patent, is:

1. A vacuum brake relay valve comprising a body, flexible diaphragm walls therein forming boundaries of an atmosphere power chamber, at one end of said body, a control chamber opposite said atmosphere chamber spaced therefrom, rigid wall bounding a suction chamber, a brake operating chamber and an auxiliary reservoir chamber between said diaphragms, a lost motion valve stem between said diaphragms with the lost motion parts arranged to abut upon contact by control, said suction chamber provided with inlet and opposite suction outlets, control valves on said outlets, the said valves being coaxial with and mounted on said valve stem, with the lost motion device between the said valves.

2. A vacuum relay valve for brakes comprising a body that encloses a suction chamber provided with two valved ports, an adjacent reservoir chamber, an atmosphere chamber, a control chamber, the atmosphere and control chambers being defined by flexible atmosphere and control diaphragms, a lost motion valve stem between said diaphragms, with the parts thereof within said suction chamber, a poppet brake operating valve on one of said suction chamber ports flexibly connected to one part of said stem to control power from said suction chamber, and a reservoir replenishing valve slidably mounted on said other suction chamber port and openable by excess available suction to replenish said reservoir after said first named valve has operated and reclosed.

3. A vacuum brake relay valve structure having in combination, a suction chamber, a vacuum reserve chamber, a brake operating chamber, valves for coordinating said chambers, opposed atmosphere and control diaphragm means for operating said valves, said valves seated on opposite sides of said suction chamber, valve seats therefor, a lost motion valve stem between said diaphragms and coaxial with said valves, one valve peing slidable on said stem, a coaxial pilot valve for said slidable valve, said pilot valve operable by said lost motion valve stem in response to high vacuum in said suction chamber.

4. The structure as claimed in claim 3 in which one of said valves is a main brake applying valve and the other said valve is for controlling communication between said suction chamber and said vacuum reserve chamber, being formed as a composite valve with a pilot opening in the center thereof and a pilot valve normally spring urged to close said pilot opening.

5. A relay valve for vacuum brake control comprising a chambered body, opposed control and atmosphere diaphragms at opposite ends of said body, a valve stem therebetween, a lost motion device associated with said valve stem, a main suction chamber through which said valve stem passes, coaxial valve seats formed in walls of said suction chamber surrounding said stem, valves mounted for relative longitudinal movement on said stem to control said valve seats, one of said valves being a main brake applying valve and the other a control for an auxiliary reservoir, said last named valve being a composite valve provided with a coaxial pilot valve seat and a spring urged pilot valve of the character described cooperative therewith.

NORMAN C. WILLIAMS.

REFERENCES CITED

The following references are of record in the file of this patent:

UNITED STATES PATENTS

| Number | Name | Date |
|---|---|---|
| 1,583,642 | Bailey | May 4, 1926 |
| 1,807,970 | Davis | June 2, 1931 |
| 2,304,621 | Baade et al. | Dec. 8, 1942 |
| 2,429,196 | Price | Oct. 14, 1947 |